United States Patent [19]

May

[11] 4,300,498
[45] Nov. 17, 1981

[54] AUTO-IGNITING, FOUR-CYCLE, PISTON-TYPE INTERNAL COMBUSTION ENGINE

[76] Inventor: Michael G. May, Bel Air, CH-1180 Rolle, Switzerland

[21] Appl. No.: 143,408

[22] Filed: Apr. 25, 1980

[30] Foreign Application Priority Data

Aug. 28, 1979 [DE] Fed. Rep. of Germany ....... 2934615

[51] Int. Cl.³ .................. F02B 19/08; F02B 23/02
[52] U.S. Cl. .................. 123/263; 123/276; 123/661
[58] Field of Search ............ 123/263, 276, 306, 307, 123/309, 262, 661

[56] References Cited

U.S. PATENT DOCUMENTS

| | | | |
|---|---|---|---|
| 2,837,068 | 6/1958 | Lang | 123/276 X |
| 2,851,019 | 9/1958 | Fleming et al. | 123/276 X |
| 3,220,389 | 11/1965 | Van Rinsum et al. | 123/269 X |
| 4,000,722 | 1/1977 | May | 123/281 X |
| 4,026,250 | 5/1977 | Funiciello | 123/262 X |
| 4,094,272 | 6/1978 | May | 123/309 |
| 4,237,827 | 12/1980 | Hamai | 123/269 X |

FOREIGN PATENT DOCUMENTS 504440 12/1954 Italy ......................... 123/661

Primary Examiner—Tony M. Argenbright
Attorney, Agent, or Firm—Edwin E. Greigg

[57] ABSTRACT

An internal combustion engine having intake and exhaust valves and a companion piston therefor in a cylinder block is proposed, the piston being provided with several depressions of varying depth and area and interconnected by a guide groove to control flow of the gaseous mixture from one depression to another. A first of the depressions in the piston is located at a distance from the longitudinal axis of the piston and one of the valves has a flat face which is substantially received in the depression. The other depression in the piston also has an axis that is spaced from the longitudinal axis of the piston with the guide groove which communicates with the first depression having a mouth that extends substantially tangentially into said second depression so that the vortex gaseous flow rotates approximately parallel to said piston top about the central longitudinal axis of the second depression toward the end of the compression stroke. It is also contemplated that the first depression can be disposed in the cylinder head with the inlet valve being received in the base of the depression. Several other embodiments are disclosed.

28 Claims, 10 Drawing Figures

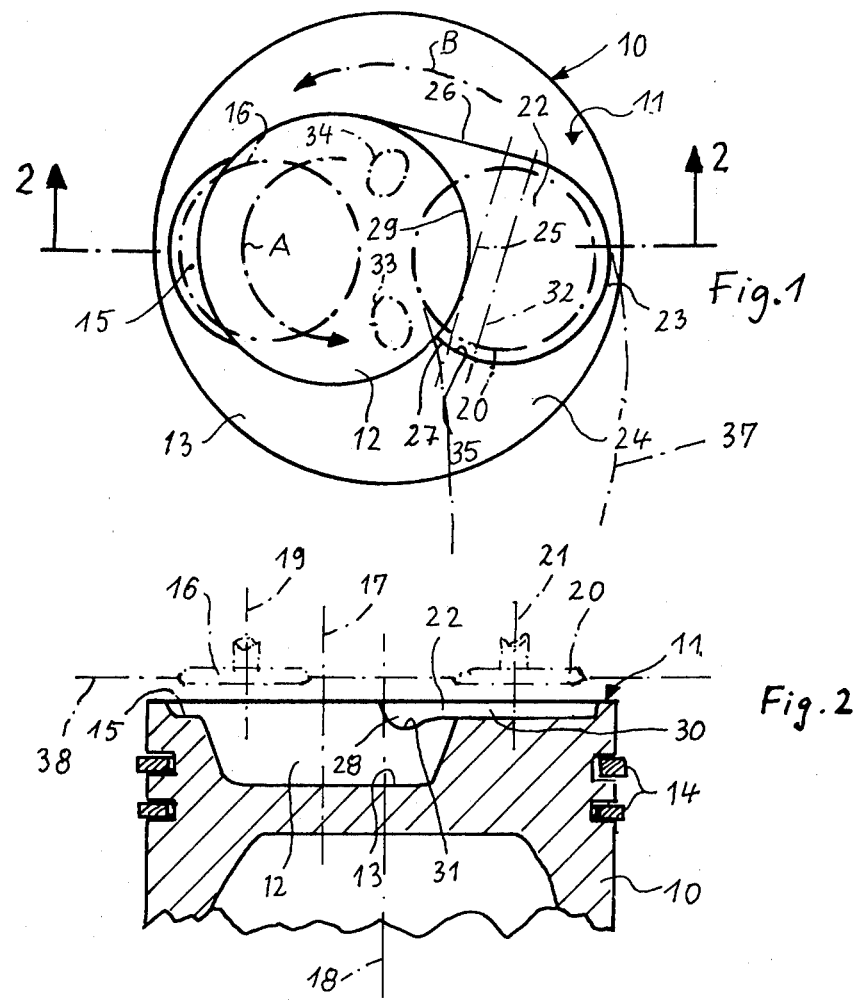

AUTO-IGNITING, FOUR-CYCLE, PISTON-TYPE INTERNAL COMBUSTION ENGINE

CROSS-REFERENCE TO RELATED PENDING APPLICATIONS AND RELATED PRIOR ART

There are no patents or printed publications having a bearing on the patentability of the present invention, but of interest are the following co-pending applications.

May, Michael G.; U.S. application Ser. No. 143,586; filed Apr. 25, 1980; "Externally Ignited, Four Cycle, Piston-type Internal Combustion Engine."

May, Michael G.; U.S. application Ser. No. 124,889; filed Feb. 26, 1980; "Internal Combustion Engine."

None of these above, whether taken and viewed singly or in combination with each other, are believed to have a bearing on the patentability of any claim of this invention.

BACKGROUND OF THE INVENTION

The invention relates to an auto-igniting, four-cycle, piston-type internal combustion engine. Engines of this kind are also known as Diesel engines.

In a known internal combustion engine of this type (German Democratic Republic Pat. No. 91,936), a cylindrical depression is disposed in the center of the piston, coaxial with its longitudinal axis, and openings directed diagonally downward from the piston top land into this depression, the openings being inclined in such a manner that the gas jets flowing through them into the depression, toward the end of the compression stroke, are intended to generate in the depression a vortex flow running approximately parallel to the piston top. The high flow losses of the gas flows which pass through the openings are disadvantageous. Furthermore, toward the end of the compression stroke, gas also flows in substantial quantities axially and radially into the depression approximately radially from all sides and this action hinders the formation of an effective vortex flow in the depression. Combustion is also insufficient in such an engine, with the result that a substantial quantity, in percentage terms, of harmful, partially combusted components is emitted.

OBJECTS AND SUMMARY OF THE INVENTION

It is accordingly an object of the invention to create an auto-igniting, four-cycle, piston-type internal combustion engine which enables very good mixture formation and thus a high level of thermal effectiveness, while the soot limits are shifted in the direction of a lower excess-air coefficient.

As a result of this four-cycle, piston-type internal combustion engine in accordance with the invention, an extraordinarily complete combustion of the fuel-air mixture occurs in the combustion chamber of the cylinder or of each of its cylinders, because the shallow, broad guide groove brings about an effective vortex flow in the depression toward the end of the compression stroke, this vortex flow being arranged to rotate substantially parallel to the piston top and thus substantially promoting combustion.

This engine, in accordance with the invention, because of its favorable properties, also has a low specific fuel consumption, particularly in the partial-load range, so that it can operate very economically. Because of the very rapid and more complete combustion, only relatively small amounts of harmful components, such as carbon monoxide and hydrocarbons, are formed.

It is furthermore possible to attain a smaller ignition delay, which reduces thermal and mechanical loads and reduces noise buildup in the engine. Improved cold starting and/or warm-up behavior is also attained.

The depression may be disposed in the cylinder head or in the piston top. It is also possible to provide a further shallow indentation in addition to the depression in the cylinder head or piston top, which indentation is aligned with the depression, so as to extend the depression somewhat into the part which is opposite it when the piston is in the top dead center position.

The guide groove or grooves may preferably be disposed in the same part in which the bowl-like depression is located, although, in some cases, the guide groove may be located in the part opposite the depression (that is, in the cylinder head or in the piston).

If the depression is cut into the piston top, there are substantial advantages for the cylinder head, because it can be accomplished with a lower structural height and its cooling is simplified. If, in addition, the guide groove or grooves are provided exclusively in the piston top and not in the cylinder head, the design of the cylinder head and its maufacture are simplified still further.

It is also possible in many cases that two guide grooves be provided which face each other in the cylinder head and in the piston top. In this event, the volume of the individual guide groove is correspondingly less, so that the two guide grooves taken together have approximately the same volume as does the one guide groove in the event that only a single guide groove is present.

If the depression and the guide groove or grooves are disposed in the piston top, the invention then also enables the problem-free conversion, with relatively little expense, of the mass production of internal combustion engines having known depression-equipped pistons to mass production with the depression-equipped piston in accordance with the invention. It even permits engines which have already been manufactured, and which in some cases are already in operation, to be equipped subsequently with the new depression-equipped piston.

It is preferable that in the top dead center position of the piston, the volume of the depression be at least 60% and preferably from 70 to 80% of the combustion chamber volume then available.

It has proved to be particularly suitable when the guide groove is not only long but is also quite broad. When the central longitudinal axis of the depression is located at a distance from the central longitudinal axis of the piston, and the guide groove is located opposite an indentation in the cylinder head required for the valve plate, or when this indentation is entirely or in part formed by the guide groove then, despite the relatively great suitable breadth of the guide groove, there are still large "squeezing" surfaces at either side of the guide groove which, toward the end of the compression stroke, direct squeeze flows into the guide groove which then flow toward the depression in the longitudinal direction of the guide groove and generate in the depression a vortex flow which is extremely effective for combustion. The valve plate of the other gas exchange valve may then be suitably located either entirely or substantially above the depression or in the depression, so that the indentation in the cylinder head and/or piston top required for this gas exchange valve can be formed at least partially by the depression. Thus the total squeezing surface of the piston top and of the cylinder head as well is both particularly large and also particularly favorable in form and position for the generation of the vortex flow in the depression. The "squeezing" surface or surfaces of the piston top and the cylinder head are understood as those surface areas which, in the top dead center position of the piston, are at a very small distance from one another, i.e., a distance which is normally as small as possible and amounts to approximately 1 mm, for example. The term "squeezing zone" is understood to be the zone between these two squeezing areas.

The squeezing surfaces could actually be still further enlarged, if the guide groove is narrow rather than broad. However, the gas quantity which flows through the guide groove then becomes smaller and advances at a slower rate and, if it is desired to enlarge the cross section by means of deepening the guide groove, then the flow is slowed down still further. It is known to guide the gas supply channel, which can be closed off by the inlet valve and which leads into the particular cylinder, toward the combustion chamber of this cylinder in such a fashion that the gas flow through it into the combustion chamber rotates about the longitudinal axis of the cylinder as a vortex flow. In order that this vortex flow does not disturb the vortex flow being formed in the depression but rather reinforces it, the vortex direction of the gas flow, effected by the gas which overflows out of the guide groove into the depression, enters the depression in the same direction as the above-described vortex flow.

In a preferred embodiment, the cross-section of the guide groove, in that longitudinal portion which begins at the cross-sectional plane determined by the central longitudinal axis of the valve plate located within or above the guide groove and which extends up to the depression, changes little in the direction of the depression and enlarges by a maximum of 30% with respect to the cross section in the plane determined by the central longitudinal axis of the particular gas exchange valve, and preferably by less than 20%.

Preferred fields of application of the invention are vehicle engines, such as automobile, boat or airplane engines.

In an internal combustion engine which has one or more cylinders, where the displacement of the cylinder or of each cylinder amounts to 200 to 700 $cm^3$, the depth of the guide groove below the valve plate located above it can amount to from 1 to 4 mm and preferably 2 to 3 mm. The maximum depth of the guide groove in the downstream direction may increase up to 3 to 9 mm, and preferably 4 to 7 mm, at or near the discharge point. If the piston displacement is increased, these values can be increased approximately in proportion thereto.

In many cases, the bottom of the guide groove may be substantially planar and preferably flat, inclined obliquely downward both toward the depression and also toward the longitudinal side wall of the guide groove which merges approximately tangentially with the circumferential wall of the depression and includes the first longitudinal rim. This has advantages with respect to manufacturing techniques and yet still produces very good combustion in the combustion chamber.

The intensity of the vortex of the depression may be still further increased if a concave indentation which extends in the longitudinal direction of the guide groove is cut into the bottom of the guide groove adjacent to its longitudinal side wall which merges approximately tangentially with the circumferential wall of the depression, the breadth of the concave indentation being less than half the breadth of the bottom of the guide groove.

The volume of the guide groove is suitably small. It is preferable that the volume of the guide groove which remains available at the top dead center position of the piston with respect to the valve plate is less than 12%, and preferably from 4 to 10%, of the combustion chamber volume available when the piston is in this position.

It is also a particular advantage of the invention that the inside volume of the guide groove available in the top dead center position of the piston can be still further substantially reduced by means of the particular valve plate, in that the valve plate, as preferably provided, protrudes into this guide groove by preferably 1 to 2 mm in this top dead center position of the piston. As a result, the volume of the guide groove, which is already quite small, is still further reduced toward the end of the compression stroke in that the valve plate forms a compressing surface which, toward the end of the compression stroke, forces additional gas out of the guide groove into the depression and thus still further reduces the volume of that part of the combustion chamber located outside the depression at the onset of combustion. This advantage is obtained even while there is a still further intensification, favoring combustion, of the vortex flow.

In a preferred embodiment, the height of the longitudinal side wall of the guide groove which merges approximately tangentially with the circumferential wall of the depression increases in the direction of the depression from a minimum value to a maximum value in such a manner that the angle encompassed by the upper and the lower rim of this longitudinal side wall amounts to a maximum of 10° and preferably 3° to 6°. As a result, the cross-section of the guide groove in the downstream direction is increased in an advantageous manner and the lateral inflow of gas from the squeezing zones located at either side thereof is advantageously taken into consideration.

The maximum breadth of the guide groove may be particularly advantageously located at a distance from the piston rim or from the circumferential wall of the interior of the cylinder with the breadth of the guide groove preferably decreasing in the downstream direction from this point of maximum breadth, preferably by a maximum of 20%. As a result, the squeezing zone can be increased further. A large breadth of the guide groove at the rim of the piston is a useless waste of squeezing surface and also an unnecessary incease of the volume of the guide groove available in the top dead center position. The mixture located in this guide groove burns more slowly than does that in the depression.

The fuel injection nozzle may be suitably disposed opposite the depression in the cylinder head. Preferably the plan surface of the guide groove determined by the upper rim of the guide groove can be at least 8 times, and preferably at least 10 times, greater than the overflow cross section of the guide groove where it enters into the depression.

The maximum breadth of the guide groove may preferably be at that point which passes through the central longitudinal axis of the particular valve plate.

With respect to the relatively large breadth of the guide groove, it is suitable for the sector angle relative to the longitudinal axis of the depression of the mouth of the guide groove which enters into the depression to be preferably at least 70° and, in particular, at least 85°. Sector angles larger than 90°, and preferably from 95° to 120°, have proved to be particularly suitable.

In order that no gas flow component should enter the depression from the guide groove in a direction counter to that of the vortex flow around the central longitudinal axis in the depression, it may suitably be provided that the tangent of the second longitudinal rim of the guide groove or the particular longitudinal side wall of the guide groove directly in front of the breakaway point of the flow which enters the depression from the guide groove passes through the terminal area located between the central longitudinal axis of the depression and the remaining mouth of the guide groove. Preferably, said tangent can enter into the depression at an angle of 40° to 80° toward the adjacent downstream rim of the bottom of the guide groove. In order thereby to provide the inflow of the gas into the depression while providing the guide groove in a manner favorable to the flow, the second longitudinal rim of the guide groove may suitably be curved in a slightly concave fashion at least in the vicinity of the mouth of the guide groove.

In order to obtain the longest possible guide groove with the depression disposed in the piston top, it is further suitable for the depression to be at only a small distance from the circumferential wall of the piston, this distance preferably being less than 10% of the piston diameter and, in particular, being such as is still permissible on thermal grounds for the function of the piston rings, and for the guide groove to begin at that zone on the piston top rim which is diametrically opposed to this zone of minimum distance of the depression from the piston circumference or to begin at only a small distance from this zone on the rim.

It is preferable that a single guide groove leads to the depression. However, it may be, in many cases, that a plurality of guide grooves lead to the depression and, particularly, when more than two gas exchange valves are provided, such as two inlet valves and/or two outlet or exhaust valves.

To attain the most extensive possible expulsion of the combusted charge, the valve plate of the exhaust valve or of one of the exhaust valves is disposed in or above the depression and the valve plate of the inlet valve or of one of the inlet valves is disposed in or above the guide groove. This has the advantage that the higher temperature of the exhaust valve plate additionally favors combustion in the depression and also induces combustion more rapidly.

It is also suitable, in many cases, for the guide groove to have a nonuniform depth over its breadth and to incline flatly upward from its lowermost longitudinal area which may be suitably provided in the vicinity of the first longitudinal rim of the guide groove, toward the longitudinal side wall of the guide groove having the second longitudinal rim or, in many cases, also to incline flatly up to the second longitudinal rim of the guide groove.

The breadth of the guide groove, at least from the point of its greatest breadth up to the depression, is substantially greater than its depth and its breadth, in this region, is preferably not smaller than, or only relatively little smaller than, the diameter of the valve plate located opposite it. As a result, there is created a large broad are surrounded by squeezing surfaces which is formed by the guide groove into which, toward the end of the compression stroke, gas can flow from the large squeezing surfaces and, in some cases, from the rearward rim of the guide groove as well. Because of the shallow depth of the guide groove, relatively high flow velocities occur in the gas flow in the guide groove toward the depression and the sole vortex flow, which has been mentioned and which rotates always during the compression stroke in the same rotational direction about the longitudinal axis of the depression, is securely generated in the depression so that combustion of the fuel-air mixture occurs in optimal fashion.

Although it is possible, and in many cases advantageous, to embody the depression as approximately circular, it is particularly advantageous, for the sake of attaining the longest possible guide groove and the largest possible squeezing surfaces at the side of the guide groove, for the depression to have a curved circumferential wall of continuous curvature which wall has a maximum diameter in one central longitudinal plane and has a smaller diameter in a central longitudinal plane located perpendicular to the former and that the central longitudinal plane, determined by this smaller diameter, passes through the mouth of the guide groove. This depression can thus, as in the other embodiment of the depression as well, always be suitably disposed as closely as possible to the rim area of the piston or of the inner circumferential wall of the cylinder remote from the guide groove, or in the case of the rim area of the piston as closely as the thermal load on the piston rings technically permits. The guide groove may suitably be formed so that at least one of its longitudinal rims is the upper rim of one longitudinal side wall of the guide groove. However, it is also possible in many cases, to form the cross section of the guide groove such that there is no "longitudinal side wall" as such, in that the groove has a constant flat concave curve from one longitudinal rim to the other.

It is particularly suitable to form the bottom of the depression approximately flat and the circumferential wall of the depression slightly conical. The circumferential wall of the depression can suitably merge via a curved portion with the bottom.

In order for the guide groove to be as long as possible it is suitable for it to begin at the rim of the piston or at a small distance therefrom, preferably less than 5 mm. The length of the guide groove may suitably be at least 0.25 times the piston diameter and preferably about 0.3 to 0.5 times the piston diameter.

As has already been mentioned, it is suitable for the longitudinal rims of the guide groove to be adjacent to squeezing surfaces. These squeezing surfaces may suitably extend up to the piston rim or the inner circumferential wall of the piston, i.e., they are not recessed. Depending on the embodiment of the piston top, they may be flat or slightly curved.

In a preferred embodiment, the breadth of the mouth of the guide groove is at least 3 times larger, and preferably at least 4 times and, in particular, at least 6 times larger than its average depth at this mouth. Furthermore, the depth of the depression can be preferably at least 3 times larger and preferably approximately 3.5 to 5 times larger, than the average depth of the guide groove at its mouth. As a result, good combustion levels are attained. The intensity of the vortex flow arising in the depression toward the end of the compression stroke can be still further increased in that the depth of the guide groove increases transversely to its longitudinal direction in the direction of its longitudinal side wall which merges approximately tangentially with the circumferential wall of the depression.

The invention will be better understood and further objects and advantages thereof become more apparent from the ensuing detailed description of preferred exemplary embodiments taken in conjunction with the drawings.

BRIEF DESCRIPTION OF DRAWINGS

FIG. 1 is a plan view of the piston top of a piston constructed in accordance with the invention wherein areas of the associated cylinder head which are located above the plane of the drawing are indicated by dot-dash lines;

FIG. 2 is a sectional view taken through FIG. 1, along the line 2—2;

DESCRIPTION OF THE PREFERRED EMBODIMENTS

Figure 3:
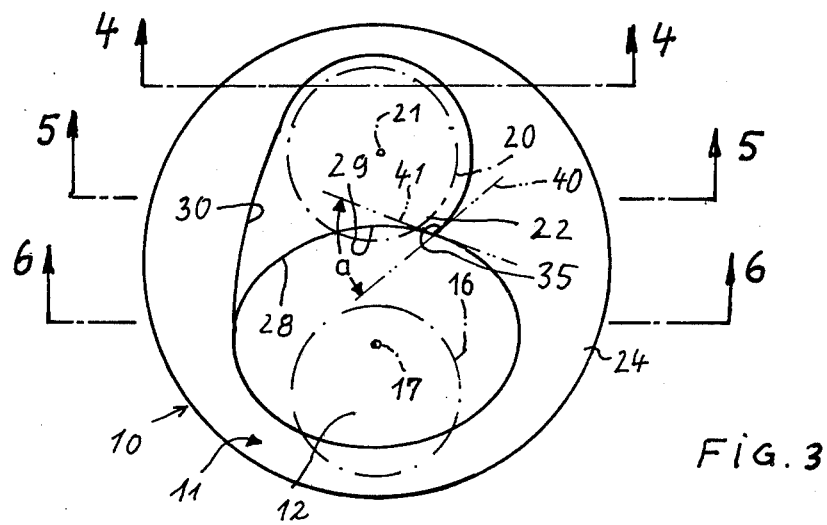
FIG. 3 is a plan view of a piston constructed in accordance with a second embodiment of the invention.
Figure 4:
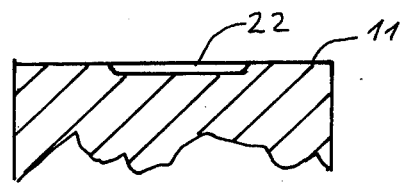
FIG. 4 is a sectional view taken substantially along line 4—4 of FIG. 3 in the direction of the arrows.
Figure 5:
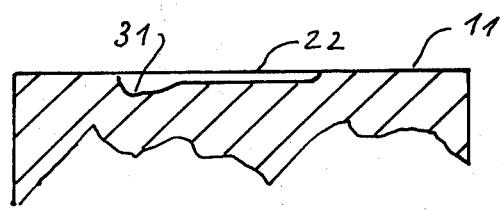
FIG. 5 is a sectional view taken substantially along line 5—5 of FIG. 3 in the direction of the arrows.
Figure 6:
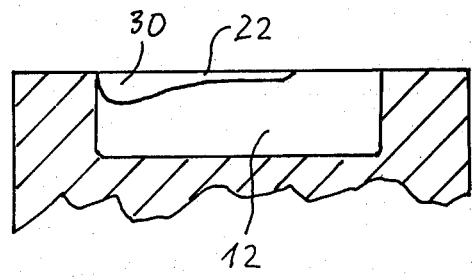
FIG. 6 is a sectional view taken substantially along line 6—6 of FIG. 3 in the direction of the arrows.

In FIGS. 1 and 2, the piston 10 of an auto-igniting, four-cycle internal combustion engine (that is, a Diesel engine) which is known in other respects is shown in a top plan view with a schematic cross-section of critical portions of the piston and valves. A circular depression 12 is formed by casting and machining in the piston top 11 and has a circumferential wall which tapers slightly toward the bottom 13, as shown in the cross-sectional view in FIG. 2. The bottom 13, which merges via a curve with the circumferential wall of this depression 12, is flat. The rim area on the left-hand side of this depression 12 (as viewed in FIG. 2) is located at a slight distance from the circumference of the piston 10, this distance being determined as the thermal load of the piston rings 14 permits.

The crescent-shaped flat indentation 15 in the left-hand rim area of the depression 12 is intended only for the purpose so that the plate 16 of the overhead valve located above this depression 12, which in this preferred embodiment is the exposed working face of the exhaust valve, cannot strike the piston top 11. This crescent-shaped indentation 15 thus does not comprise a guide groove in the sense of the invention. The central longitudinal axis 17 of the depression 12 is therefore arranged at a predetermined spaced distance from the central longitudinal axis 18 of the piston 10, the two axes 17 and 18 being parallel to one another. The longitudinal axis 19 of the exhaust valve plate 16 is thus located vertically above the depression 12.

The other gas exchange valve of this cylinder, whose valve plate is indicated by reference numeral 20 and whose longitudinal axis is indicated by reference numeral 21 in FIG. 2, is therefore preferably the valve plate of the inlet valve. This valve plate 20 is located vertically above a guide groove 22 which is flat and broad and which, as shown in FIG. 1, has a semicircular rearward rim area 23 with a radius which is somewhat larger than the radius of the inlet valve plate 20. The longitudinal axis 21 of the valve plate 20 passes through the center of curvature of this semicircular rim area 23 so that the inlet valve plate 20 can protrude into this guide groove 22 when, during the suction stroke, it opens the gas inlet of this cylinder which is below it. This semicircular rim area 23 is disposed at only a slight distance from the adjacent rim area of the piston top 11 so as to attain the best possible balance between the greatest possible length for the guide groove 22 and the greatest possible surface area for the squeezing surface 24 of the piston top 11. In fact, the entire surface 24 of the piston top which, in this illustrated embodiment is smooth, and which includes the depression 12, the crescent-shaped indentation 15 and the guide groove 22, forms one single, uninterrupted squeezing surface 24 so that a further, narrow squeezing surface area is also located between the guide groove 22 and the closest rim area thereto of the piston 10. This is particularly favorable. At either longitudinal side of the guide groove 22, in contrast, there are broad squeezing areas.

The guide groove 22 is extended adjacent to the semicircular rim area 23 up to the depression 12, wherein, in this illustrated embodiment, the guide groove 22 has an approximately constant breadth from the cross-sectional plane 32, through which the central longitudinal axis 21 of the inlet valve plate 20 passes, up to the beginning of the depression 12, i.e., up to the cross-sectional plane 25. The two longitudinal rims 26, 27 of this guide groove 22 adjacent to the semicircular rim area 23 take the substantially straight and mutually parallel courses indicated in FIG. 1. The longer and first longitudinal rim 26, which is approximately straight, and which limits the longitudinal side wall 30 of the guide groove 22 at the top, merges approximately tangentially, like this longitudinal side wall 30 as well, with the circumferential wall of the depression 12. The other longitudinal side wall 35, which is much shorter and curved in a concave manner and limited at the top by the second longitudinal rim 27, discharges into the depression 12 at an angle of approximately 90°.

The rim of the mouth 28 of the guide groove 22 which leads into the depression 12 forms a breakaway edge 29 beginning at the second longitudinal rim 27 and thus, extends up to the longitudinal side wall 30, because the side wall 30 merges approximately tangentially with the circumferential wall of the depression 12. The breakaway edge 29 preferably has only a very small radius and includes a sharp broken edge as shown in FIGS. 1 and 2. The sector angle of the mouth 28 relative to the central longitudinal axis 17 of the depression 12 is somewhat larger than 90°. The depth of the guide groove 22 of FIG. 2 is not great and is substantially less than the depth of the depression 12.

As shown, the depth of the depression 12 is less than its diameter, which is particularly convenient. The depth of the guide groove 22 in this illustrated embodiment is, at maximum, approximately one-third the depth of the depression 12. However, the average depth of the guide groove 22 is still substantially smaller because its maximum depth at the mouth 28 occurs in a concave, narrow longitudinal inward curve 31 of the guide groove 22. This narrow, concave inward curve 31 is adjacent to the longitudinal side wall 30 and extends approximately up to the cross-sectional plane 32. The remaining bottom of the guide groove 22 is approximately flat and slightly inclined downward in the direction of the depression 12.

In the cylinder head 38, there is also provided an opening 33 for an injection nozzle and, if needed, an opening 34 as well for a glow plug.

The four-cycle internal combustion engine having at least one cylinder with a piston such as piston 10 functions as follows. During the suction stroke, fresh air is induced. During the compression stroke, the air is highly compressed and shortly before the end of the compression stroke, the squeezing surfaces 24 of the piston 10 and cylinder head 38, as a result of the rapidly decreasing, small distance between them, force gas or mixture elements into the guide groove 22 from behind and from their sides, as a result of which a characteristic gas flow appears in the guide groove 22 and advances toward the depression 12. This gas flow enters the depression 12 approximately tangentially and is thereby detached at the breakaway edge 29 and sets the air into a single vortex flow which rotates in the direction of the arrow A about the central longitudinal axis of the depression 12. The squeezing surfaces 24 can thereby also squeeze some of the air located between them out of the mouth 28 of the guide groove 22 approximately radially into the depression 12. However, this air component is small because of the relatively small squeezing zone areas here and, as a result, it cannot impair the establishment of the vortex flow because of the great breadth and relatively great length of the guide groove 22.

Then, as is conventional, fuel is injected and with auto-ignition occurring in the depression 12, an extraordinarily rapid and complete combustion of the fuel-air mixture takes place. Furthermore, because the inlet valve plate 20, toward the end of the compression stroke, travels downwardly into the guide groove 22 and extends almong completely across the surface of the guide groove 22, it likewise forces some of the gas located in the guide groove 22 into the depression 12. As a result, the vortex flow is still further reinforced, and the air volume located outside the depression 12 at the instant of auto-ignition of the mixture is still further reduced so that the entire combustion takes place extremely quickly and intensively.

The embodiment in accordance with FIGS. 3–6 differs from that of FIGS. 1 and 2 primarily in that the depression 12 has an oval cross section and the longitudinal side wall 30 of the guide groove 22 merging approximately tangentially with this depression is curved in slightly concave fashion. Furthermore, the other longitudinal side wall 35 of this guide groove 22 forms a narrower angle a of about 60° leading to the adjacent area of the bottom of the mouth 28 of the guide groove 22. In fact, this angle a is the angle between the tangent 40 to the downstream end of the longitudinal side wall 35 located immediately before the breakaway edge 29 and the mount area, adjacent to this tangent 40, of the bottom of the guide groove 22, that is, its tangent 41. The cross-sectional course of the guide groove 22 can be derived from FIGS. 4–6.

The depression 12 is disposed in such a fashion that its minimum diameter is pointed approximately at the central longitudinal axis 21 of the valve plate 20 located above the guide groove 22, which is particularly advantageous. The guide groove 22 and the depression 12 are again at only slight distances from the particular adjacent rim areas of the piston top 11 of the piston 10.

In both illustrated embodiments, the central longitudinal axis 17 of the depression 12 passes virtually through the connecting line between the centers of the end faces of the valve plates 16 and 20.

In FIG. 1, the suction channel which discharges into the cylinder combustion chamber is indicated by reference numeral 37. This suction channel 37 is formed such that during the suction stroke gas which flows into the cylinder interior rotates therein in the direction of the arrow B, i.e., in the same direction as the vortex flow being established in the depression 12 (arrow A).

Figure 7:
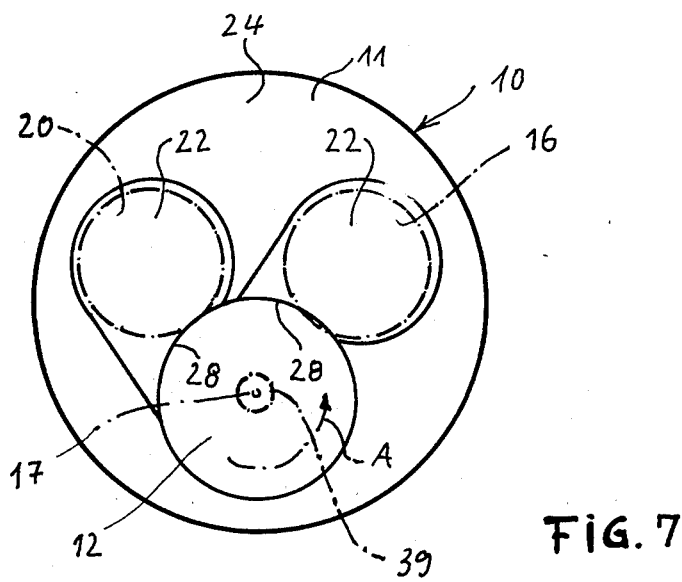
FIG. 7 is a plan view of the piston top of a piston in accordance with a further embodiment of the invention.

The piston 10 shown in the plan view in FIG. 7 differs from the pistons 10 of FIGS. 1–6 primarily in that two guide grooves 22, angularly displaced relative to one another, are disposed close together in the piston top 11, these guide grooves 22 being arranged to discharge approximately in the same direction and approximately tangentially into the depression 12. The cylinder of this Diesel engine which contains this piston 10 has, in all, two gas exchange valves, whose valve plates 16 and 20 are the outlet or exhaust valve plate 16 and the inlet valve plate 20. Each guide groove 22 is disposed below one of these two valve plates 16, 20 and is so formed that the appropriate valve plate 16, 20 can travel downwardly into it, as has already been described in connection with the embodiment of FIGS. 1 and 2. The depression 12 is located, as is permissible for the thermal load of the piston rings, as close as possible to the rim of the piston top 11, so that, again, large squeezing surfaces are located on the outside adjacent to the guide grooves 22 and, as a result, effective flows which enter the depression 12 approximately tangentially are established in the guide grooves 22 toward the end of the compression stroke, which flows generate in the depression 12 a single, intensive vortex flow (arrow A).

As may easily be seen, both gas flows which leave the guide grooves 22 and enter into the depression 12 pass between the central longitudinal axis 17 of the depression 12 and the mouths 28 of the guide grooves 22 so that these gas flows have no components which would be directed counter to the vortex flow in the direction of the arrow A. The position of the fuel injection nozzle 39 disposed in the cylinder head is such, in this preferred embodiment, that its longitudinal axis is located close to the longitudinal axis 17 of the depression 12. Because the depression 12 is not located beneath the valve plates 16 and 20, the disposition of the injection nozzle 39 is simplified and is less expensive to realize.

Figure 8:
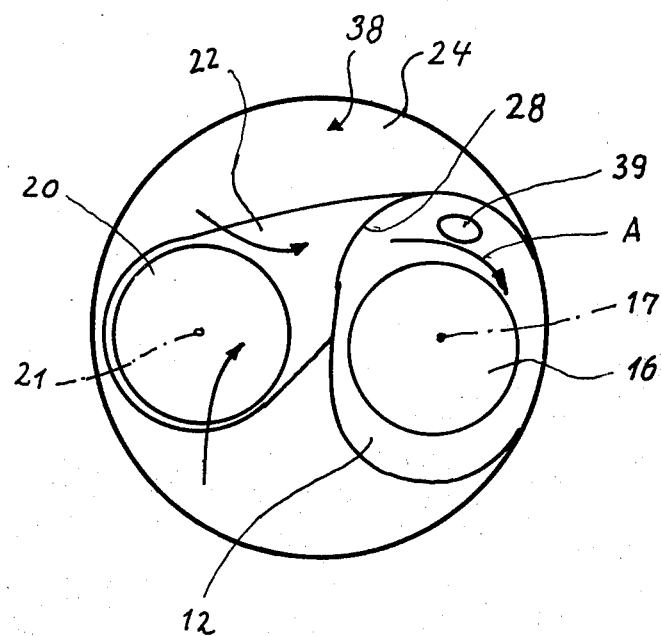
FIG. 8 is a bottom view of the top, formed by the cylinder head, of the combustion chamber of a cylinder in accordance with one exemplary embodiment of the invention.

In FIG. 8, the top of a combustion chamber of one cylinder in a Diesel engine is shown in one advantageous embodiment, this top being formed by the cylinder head 38. The disposition and form of the guide groove 22 and of the depression 12 are similar to the embodiment of FIGS. 3 and 4. However, here they are located not in the piston top but rather in the cylinder head and, furthermore, the outlet opening of this combustion chamber, which can be closed off by the valve plate 16 of the outlet valve, is disposed in the top of the depression 12. The injection nozzle 39 is located in the lateral wall of the depression 12. The gas inlet opening of this cylinder, which can be closed off by the valve plate 20 of the inlet valve, is disposed in the rearward end area of the guide groove 22.

The guide groove 22 is lengthened, as shown, from the indentation required for this valve plate 20 in the cylinder head and forms one part of the guide groove 22 up to the depression 12, with its greatest breadth being located at the cross section through which the central longitudinal axis 21 of the valve plate 20 passes. From there, the breadth of the guide groove 22 decreases both toward the rear and also in the direction of the depression 12, as shown. Again, there are large areas of the squeezing surface 24 located at both sides of the guide groove 22 so that toward the end of the compression stroke, an intensive air flow is generated in the guide groove 22 in the direction of the depression 12, which flow establishes in the depression an intensive vortex flow in the direction of the arrow A which rotates about the longitudinal axis 17 of this depression 12. The upper rim of the depression 12 is adjacent to the rim area, located approximately diametrically opposite the guide groove 22, on the circumferential rim of the top of the combustion chamber, as shown.

Figure 9:
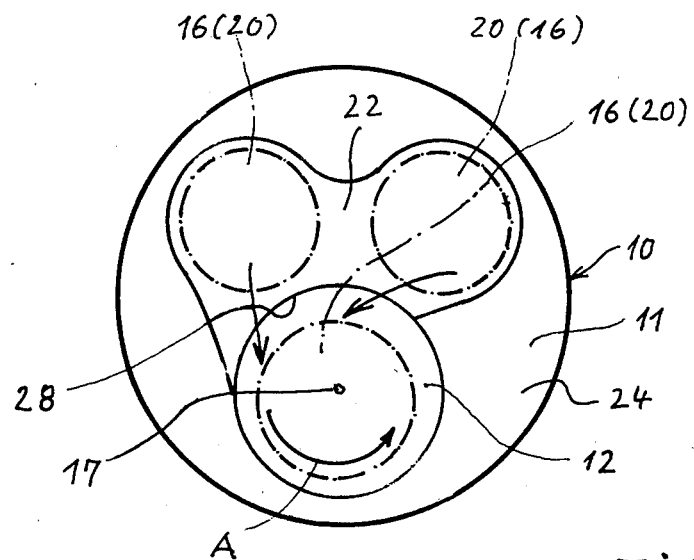
FIG. 9 is a plan view of the piston top of a piston constructed in accordance with a further embodiment of the invention.

The embodiment of FIG. 9 again is a plan view of a piston 10, whose piston top 11 is formed similarly to that of the embodiment of FIG. 7 and has a depression 12 disposed as in the embodiment of FIG. 7 which also has a circular cross section. There are essentially only these following differences from the embodiment shown in FIG. 7. The two separate guide grooves 22 present in the piston 10 in the embodiment of FIG. 7 are united in the piston 10 in the embodiment of FIG. 9 and have a single, common mouth 28 which leads into the depression 12, this mouth 28 being arranged to extend over a large sector angle of more than 120° relative to the central longitudinal axis 17 of the depression 12. If two gas exchange valves in all are disposed in the cylinder head, i.e., a single inlet valve plate 20 and a single outlet or exhaust valve plate 16, then these two valve plates 16, 20 can advantageously be disposed, as shown, above the unitary guide groove 22 away from the depression 12. If the cylinder has three gas exchange valves, for example, two inlet valves and one outlet valve or two outlet valves and one inlet valve, then two of their valve plates 16 and/or 20 may be disposed above the guide groove 22 and the third valve plate 16 or 20 can be disposed above the depression 12, as is indicated by dot-dash lines.

Figure 10:
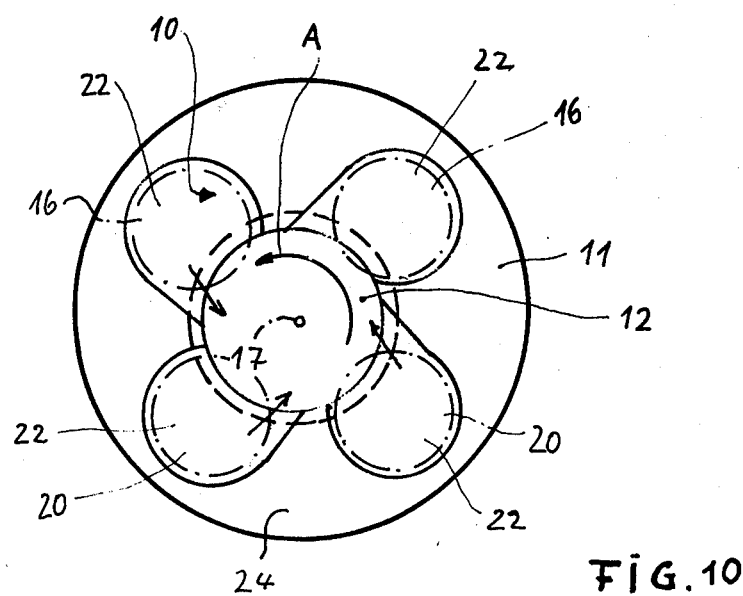
FIG. 10 is a plan view of the piston top of a piston constructed in accordance with a still further embodiment of the invention.

The plan view in FIG. 10 of the piston top 11 of a piston 10 in accordance with a further embodiment shows a circular depression 12 disposed centrally in the piston top 11, into which depression 12 four identically formed guide grooves 22 in all, disposed at equal angular distances from one another, discharge approximately tangentially and in the same direction, so that the gas which flows out of these guide grooves 22 and into the depression 12 toward the end of the compression stroke again establish an intensive vortex flow about the longitudinal axis 17 of the depression 12, which is in alignment with the longitudinal axis of the piston 10. At either longitudinal side of each guide groove 22 there are large squeezing surface areas 24, and toward the rear of each guide groove 22 there is a further, narrow squeezing surface area, so that the gas flows which enters the depression 12 through the guide grooves 22 toward the end of the compression stroke cause an intensive vortex flow in the depression 12 in the direction of the arrow A.

As may be seen from FIG. 10, the circular bottom of the depression 12, in this embodiment, has a larger diameter than does its upper opening. In fact, it is particularly suitable in this embodiment for the circumferential wall of the depression 12 to become wider in diameter from the upper opening toward the bottom, preferably in approximately frustoconical fashion. The bottom of the depression 12 can be approximately flat. This piston 10 of FIG. 10 is particularly advantageous in combination with a cylinder head which has two outlet or exhaust valves and two inlet valves, whose valve plates 16, 20, are located above the guide grooves 22 and are preferably arranged to protrude somewhat into them in the top dead center position of the piston 10, as is indicated by dot-dash lines.

This undercutting of the depression 12 has the advantage, in particular, in that the squeezing surface 24 and the length of the guide grooves 22 can be larger than without such undercutting. Depressions with undercutting can be suitably provided in many cases even in embodiments in which there are fewer than four guide grooves.

If the depression 12 is located in the cylinder head, as is the case, for example, in the embodiment of FIG. 8, it is particularly suitable that the opening of the depression 12 oriented toward the piston 10 be located entirely inside the geometric cylindrical surface determined by the piston path in the cylinder, preferably at a small distance from this cylindrical surface or adjacent thereto. The term depression, recess, indentation and tub-shaped as used within this specification, comprehend the term "depression" or "depression means".

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A self-igniting four-cycle internal combustion engine comprising: cylinder means, cylinder head means attached to said cylinder means, a piston having a top moving reciprocatingly within said cylinder means thereby defining a combustion chamber of varying geometry, the cylinder head means comprising inlet and outlet ports closable by corresponding inlet and outlet valves comprising valve plates, a depression means formed selectively in one of said cylinder head means, said piston top, or partially incorporated in opposite portions of both of said piston top and cylinder head, said depression means being of compact type and forming a main combustion chamber, and being offset in respect to the central axis of the cylinder means in such a manner as to leave a large squish area or squish zone in the remaining area of the cylinder head means and the piston top when the piston reaches its top dead center position; at least one wide and shallow guide groove being provided in said squish zone in which at least one of said valve plates may intrude in that area of the guide groove where said guide groove originates, said guide groove leading substantially tangentially toward said depression means so as to generate or reinforce therein a vortex flow by the exclusive action of the impulse transfer generated by the glass being squished out of the squish zone when the piston approaches its top dead center position and being partially collected in said guide groove and directed toward said chamber in said tangential manner where they impinge upon the charge contained in said chamber.

2. An internal combustion engine as defined in claim 1, including means for establishing a rotating motion of the charge in the cylinder in a given direction of rotation about the axis of the cylinder and wherein said guide groove extends approximately in said given direction of rotation of the charge in said cylinder thereby adding toward the end of the compression stroke of said piston this vortex generating impulse to the vortex impulse of the charge.

3. An internal combustion engine as defined in claim 1, wherein said combustion chamber is located essentially under one of said valve plates and the collecting zone under the other of said valve plates.

4. An internal combustion engine as defined by claim 1, wherein the valve plate above said chamber is said exhaust valve plate and the valve plate above said collecting zone is said inlet valve plate.

5. An internal combustion engine as defined by claim 1, wherein said chamber is arranged at least essentially in the piston top of said piston.

6. An internal combustion engine as defined by claim 1, wherein said chamber is arranged at least essentially in said cylinder head.

7. An internal combustion engine as defined by claim 1, wherein said chamber has an essentially concave curved wall, the chamber having in a central longitudinal plane a maximum diameter and in a central longitudinal plane perpendicular thereto has a smaller diameter and that the central longitudinal plane determined by this smaller diameter passes nearby or through the central axis of said valve plate protruding into said guide groove.

8. An internal combustion engine as defined in claim 1, wherein the volume of said depression in said piston top amounts to within the range of between 60% and 80% of the available combustion chamber volume in the top dead center position of said piston and that the depth of said depression is smaller than its maximum diameter.

9. An internal combustion engine as defined by claim 1, wherein said guide groove comprises a first longitudinal rim leading substantially tangentially toward said chamber and a second rim, upstream said first rim in respect to the vortex flow in said chamber leading in the way of a detaching edge into the side wall of said combustion chamber, the zones outside that guide groove and said chamber being squish zones.

10. An internal combustion engine as defined by claim 1, wherein one longitudinal side wall of said guide groove merges approximately tangentially with said circumferential wall of said depression, and that the remaining rim of said mouth of said guide groove is formed in said depression or chamber as a breakaway edge.

11. An internal combustion engine as defined by claim 1, wherein the bottom view surface of the guide groove defined by its upper rim is at least 8 times, preferably 10 times larger than the flow section of the mouth of said guide groove where it joins said chamber.

12. An internal combustion engine as defined by claim 1, wherein only one guide groove is provided.

13. An internal combustion engine as defined by claim 1, wherein one of said guide grooves is provided under each valve plate.

14. An internal combustion engine as defined by claim 1, wherein the breadth of said guide groove at its mouth is at least three times larger and preferably six times larger than its average depth at the mouth and that the depth of the chamber is within the range of approximately 3.5 to 5 times greater than the average depth of said guide groove at its mouth.

15. An internal combustion engine as defined by claim 1, wherein the length of said guide groove corresponds at least to 0.25, preferably 0.3 to 0.5 times the piston diameter of said piston.

16. An internal combustion engine as defined by claim 1, wherein the depth of said guide groove increases transversely to its longitudinal direction in the direction of said longitudinal side wall merging approximately tangentially with said circumferential wall of said depression.

17. An internal combustion engine as defined by claim 1, wherein the height of said longitudinal side wall of said guide groove which has the first longitudinal rim increases in the direction of said depression from a minimum to a maximum value in such a fashion that the angle enclosed between the upper and the lower rim of said longitudinal side wall is within the range of between 3° to 10°.

18. An internal combustion engine as defined by claim 1, wherein the maximum breadth of said guide groove is located at a distance from said cylinder wall and that the breadth of said guide groove is reduced in the downstream direction from this point of maximum breadth by a maximum of 20%.

19. An internal combustion engine as defined by claim 1, wherein the sector angle of the mouth of said guide groove leading into said depression is within the range of 70° to 85° relative to the longitudinal axis of said depression.

20. An internal combustion engine as defined by claim 1, wherein the sector angle of the mouth of said guide groove leading into said depression is within the range of between 90° to 120°.

21. An internal combustion engine as defined by claim 1, wherein the longitudinal side wall of said guide groove having the first longitudinal rim merges approximately tangentially with the circumferential wall of said depression and that said guide groove, from its deepest longitudinal area, which is located in the vicinity of this longitudinal side wall, inclines flatly up to a second longitudinal side wall of said guide groove having the second longitudinal rim or flatly up to the second longitudinal rim of said guide groove.

22. An internal combustion engine as defined by claim 1, wherein the cross section of said guide groove in that longitudinal section which begins at the cross-sectional plane determined by the central longitudinal axis of said valve plate located above it and extends up to said depression changes little in the direction of the depression and enlarges only within the range up to 30%, preferably less than 20%, relative to the cross section in the plane determined by the central longitudinal axis of said gas exchange valve.

23. An internal combustion engine as defined by claim 1, wherein the displacement of said at least one cylinder amounts to 200 to 700 cm³, characterized in that the depth of said guide groove below said valve plate located above it is within the range of between 1 mm to 4 mm, and that when the displacement is larger this amount increases approximately in proportion thereto.

24. An internal combustion engine as defined by claim 23, wherein the maximum depth of said guide groove increases in the downstream direction near the mouth within the range of between 3 mm to 9 mm, preferably 4 to 7 mm, with this amount of a cylinder size of 200 to 700 cm$^3$ and if the displacement is larger, increasing approximately in proportion thereto.

25. An internal combustion engine as defined by claim 1, wherein the bottom of said guide groove is substantially flat and is inclined, flatly and obliquely downward both toward said depression and toward said longitudinal side wall having said first longitudinal rim.

26. An internal combustion engine as defined by claim 1, including a concave indentation extending in the longitudinal direction of said guide groove in the bottom of said guide groove adjacent to its longitudinal side wall having said first longitudinal rim and merging approximately tangentially with said circumferential wall of said depression, the breadth of this indentation being smaller than half the breadth of the bottom of said guide groove.

27. An internal combustion engine as defined by claim 1, wherein the volume of said guide groove left available by the particular valve plate in the top dead center position of said piston is within the range of between 4% to 12% of the combustion chamber volume available in this piston position.

28. An internal combustion engine as defined by claim 1, wherein said valve plate located above said guide groove is protruding in its closed position, over said cylinder head and, in this position, in the top dead center position of said piston, intrudes into said guide groove.

* * * * *